United States Patent
Starner et al.

(10) Patent No.: US 10,698,999 B2
(45) Date of Patent: *Jun. 30, 2020

(54) AUTHENTICATION USING AN INTERACTIVE CORD

(71) Applicant: Google LLC, Mountain View, CA (US)

(72) Inventors: Thad Eugene Starner, Atlanta, GA (US); Karissa A. Sawyer, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,216

(22) Filed: Aug. 13, 2018

(65) Prior Publication Data
US 2018/0357405 A1    Dec. 13, 2018

Related U.S. Application Data

(63) Continuation of application No. 15/202,477, filed on Jul. 5, 2016, now Pat. No. 10,083,289.

(60) Provisional application No. 62/238,551, filed on Oct. 7, 2015.

(51) Int. Cl.
*G06F 7/04* (2006.01)
*G06F 21/36* (2013.01)

(52) U.S. Cl.
CPC .................................. *G06F 21/36* (2013.01)

(58) Field of Classification Search
CPC ........................................................ G06F 21/36
USPC ...................................................... 726/26–30
See application file for complete search history.

(56) References Cited

U.S. PATENT DOCUMENTS

| 6,989,679 | B2 | 1/2006 | Lider et al. |
| 7,388,166 | B2 | 6/2008 | Marmaropoulos |
| 8,094,673 | B2 | 1/2012 | Proctor et al. |
| 9,432,366 | B2* | 8/2016 | Apostolos ........... H04L 63/0861 |
| 9,807,852 | B1 | 10/2017 | Starner et al. |
| 10,047,459 | B1 | 8/2018 | Starner et al. |
| 10,083,289 | B1 | 9/2018 | Starner et al. |
| 10,111,304 | B2 | 10/2018 | Starner et al. |
| 2007/0237170 | A1 | 10/2007 | Proctor et al. |
| 2007/0274530 | A1 | 11/2007 | Buil et al. |
| 2008/0158145 | A1 | 7/2008 | Westerman |
| 2009/0212909 | A1* | 8/2009 | Burger ............. G06K 19/06206 340/5.81 |

(Continued)

OTHER PUBLICATIONS

Chang et al., "Recognition of Grip-Patterns by Using Capacitive Touch Sensors," 2006 IEEE International Symposium on Industrial Electronics Year: 2006, vol. 4 pp. 2936-2941.*

(Continued)

*Primary Examiner* — Roderick Tolentino
(74) *Attorney, Agent, or Firm* — Colby Nipper PLLC

(57) ABSTRACT

This document describes authentication using an interactive cord. An interactive cord includes a cable, and a fabric cover that covers the cable. The fabric cover includes one or more conductive threads woven into the fabric cover to form one or more capacitive touchpoints which are configured to enable reception of touch input that causes a change in capacitance to the one or more conductive threads. The interactive cord can be used to authenticate a user. For example, rather than using a password entered into a computing device, a touch input pattern can be provided to interactive cord that is coupled to the computing device to authenticate the user.

23 Claims, 11 Drawing Sheets

(56) References Cited

U.S. PATENT DOCUMENTS

| | | |
|---|---|---|
| 2009/0257604 A1 | 10/2009 | Yeates |
| 2010/0116229 A1 | 5/2010 | Kojima |
| 2010/0315299 A1 | 12/2010 | Bibl et al. |
| 2011/0285554 A1 | 11/2011 | Aghaei et al. |
| 2011/0316611 A1 | 12/2011 | Gustavsson |
| 2012/0184367 A1 | 7/2012 | Parrott et al. |
| 2012/0206330 A1* | 8/2012 | Cao ................. G06F 3/0383 345/156 |
| 2012/0268406 A1* | 10/2012 | Trachte ............ B60K 35/00 345/173 |
| 2013/0102361 A1 | 4/2013 | Colley et al. |
| 2013/0120052 A1 | 5/2013 | Siska |
| 2013/0129163 A1* | 5/2013 | Chung, II ......... G06K 9/0004 382/124 |
| 2013/0326604 A1* | 12/2013 | Hird .................. G06F 21/31 726/7 |
| 2014/0238151 A1 | 8/2014 | Dune et al. |
| 2014/0294192 A1 | 10/2014 | Haynes |
| 2014/0313156 A1* | 10/2014 | Tenuta ............... G06F 3/044 345/174 |
| 2015/0195903 A1* | 7/2015 | Sadasivan ......... B32B 38/10 174/255 |
| 2015/0212605 A1 | 7/2015 | Lien |
| 2015/0334485 A1 | 11/2015 | Tyagi et al. |
| 2015/0346865 A1* | 12/2015 | Hong ................. G06F 3/044 345/174 |
| 2015/0381609 A1* | 12/2015 | Dadu ................. H04L 63/0861 726/9 |
| 2016/0100244 A1 | 4/2016 | Gentile et al. |
| 2016/0127050 A1* | 5/2016 | Antoine ............. H04W 12/04 398/40 |
| 2016/0284436 A1 | 9/2016 | Fukuhara et al. |
| 2017/0048619 A1 | 2/2017 | Bang et al. |
| 2017/0060298 A1 | 3/2017 | Hwang et al. |
| 2017/0249033 A1* | 8/2017 | Podhajny ........... G06F 3/045 |
| 2018/0049296 A1 | 2/2018 | Starner et al. |

OTHER PUBLICATIONS

Klonovs et al., "ID Proof on the Go: Development of a Mobile EEG-Based Biometric Authentication System," IEEE Vehicular Technology Magazine Year: 2013, vol. 8, Issue: 1 pp. 81-89.*

Nguyen et al., "Finger-drawn pin authentication on touch devices," 2014 IEEE International Conference on Image Processing (ICIP) Year: 2014 pp. 5002-5006.*

"Notice of Allowance", U.S. Appl. No. 15/418,432, dated Sep. 12, 2018, 12 pages.

"First Action Interview OA", U.S. Appl. No. 15/202,477, dated Jan. 11, 2018, 3 pages.

"First Action Interview Office Action", U.S. Appl. No. 15/418,470, dated Feb. 8, 2018, 4 pages.

"First Action Interview Office Action", U.S. Appl. No. 15/418,432, dated May 16, 2018, 5 pages.

"Non-Final Office Action", U.S. Appl. No. 15/202,465, dated Feb. 27, 2017, 6 pages.

"Non-Final Office Action", U.S. Appl. No. 15/792,162, dated Apr. 13, 2018, 5 pages.

"Notice of Allowance", U.S. Appl. No. 15/418,470, dated May 9, 2018, 8 pages.

"Notice of Allowance", U.S. Appl. No. 15/202,465, dated Jun. 30, 2017, 5 pages.

"Notice of Allowance", U.S. Appl. No. 15/361,338, dated Dec. 7, 2017, 9 pages.

"Notice of Allowance", U.S. Appl. No. 15/202,477, dated May 17, 2018, 10 pages.

"Notice of Allowance", U.S. Appl. No. 15/792,162, dated Jul. 17, 2018, 5 pages.

"Pre-Interview Communication", U.S. Appl. No. 15/418,432, dated Apr. 5, 2018, 4 pages.

"Pre-Interview Office Action", U.S. Appl. No. 15/361,338, dated Sep. 26, 2017, 4 pages.

"Pre-Interview Office Action", U.S. Appl. No. 15/202,477, dated Nov. 8, 2017, 4 pages.

"Pre-Interview Office Action", U.S. Appl. No. 15/418,470, dated Dec. 14, 2017, 4 pages.

"Recognition of Grip-Patterns by Using Capacitive Touch Sensors", 2006 IEEE International Symposium on Industrial Electronic 2006, vol. 4, pp. 2936-2941, Jul. 9, 2006-Jul. 12, 2006, 6 pages.

Gilliland, et al., "The Textile Interface Swatchbook: Creating Graphical User Interface-like Widgets with Conductive Embroidery", International Symposium on Wearable Computers (ISWC), Oct. 10, 2010, 8 pages.

Klonovs, et al., "Development of a Mobile EEG-Based Biometric Authentication System", IEEE Vehicular Technology Magazine 2013, vol. 8, Issue 1, pp. 81-89, 2013, 9 pages.

Komor, et al., "Is It Gropable?—Assessing the Impact of Mobility on Textile Interfaces", International Symposium on Wearable Computers, Sep. 4, 2009, 5 pages.

Nguyen, et al., "Finger-Drawn Pin Authentication on Touch Devices", 2014 IEEE International Conference on Image Processing (ICIP) 2014, pp. 5002-5006, 2014, 5 pages.

Schoessler, et al., "Cord UIs: Controlling Devices with Augmented Cables", TEI '15 Proceedings of the Ninth International Conference on Tangible, Embedded, and Embodied Interaction, Jan. 1, 2015. 4 pages.

Schwarz, et al., "Cord Input: An Intuitive, High-Accuracy, Multi-Degree-of-Freedom Input Method for Mobile Devices", Research Gate; Conference Paper, Jan. 2010, 5 pages.

Zeagler, et al., "Textile Interfaces: Embroidered Jog-Wheel, Beaded Tilt Sensor, Twisted Pair Ribbon, and Sound Sequins", 16th International Symposium on Wearable Computers, Jun. 18, 2012, 4 pages.

* cited by examiner

AUTHENTICATION USING AN INTERACTIVE CORD

RELATED APPLICATIONS

This application is a continuation of and claims priority to U.S. patent application Ser. No. 15/202,477, filed Jul. 5, 2016, and titled "Authentication Using an Interactive Cord," which, in turn, claims priority to U.S. Provisional Patent Application No. 62/238,551, filed Oct. 7, 2015, and titled "Authentication Using an Interactive Cord," the disclosure of which is incorporated by reference in its entirety.

BACKGROUND

In-line controls for cords are standard and ubiquitous for devices such as earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

SUMMARY

This document describes authentication using an interactive cord. An interactive cord includes a cable, and fabric cover that covers the cable. The fabric cover includes one or more conductive threads woven into the fabric cover to form one or more capacitive touchpoints which are configured to enable reception of touch input that causes a change in capacitance to the one or more conductive threads. A controller, implemented at the interactive cord or a computing device coupled to the interactive cord, can detect the change in capacitance and trigger one or more functions associated with the one or more capacitive touchpoints. For example, when implemented as a cord for a headset, the controller can control audio to the headset, such as by playing the audio, pausing the audio, adjusting the volume of the audio, skipping ahead in the audio, skipping backwards in the audio, skipping to additional audio, and so forth.

In one or more implementations, the fabric cover acts as an RF shield for the cable, thereby reducing the need to manufacture the cord with a separate RF shield. Doing so reduces the cost and complexity of manufacturing the interactive cord.

In one or more implementations, the interactive cord can be used to authenticate a user. For example, rather than using a password entered into a computing device, a touch input pattern or sequence can be provided to interactive cord that is coupled to the computing device to authenticate the user.

This summary is provided to introduce simplified concepts concerning an interactive cord, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for authentication using an interactive cord are described with reference to the following drawings. The same numbers are used throughout the drawings to reference like features and components.

DETAILED DESCRIPTION

Overview

Figure 1:
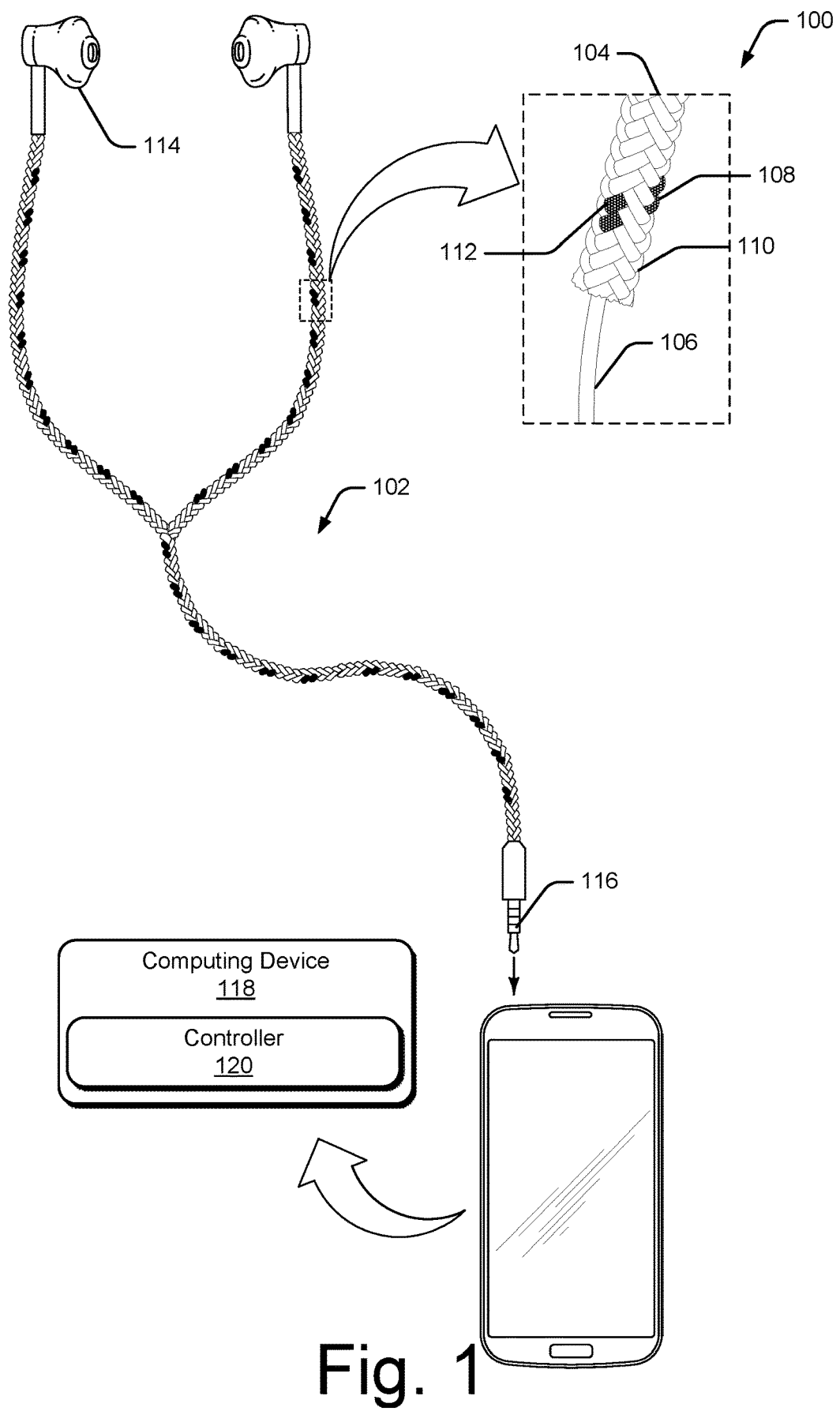
FIG. 1 is an illustration of an example environment in which techniques using, and objects including, an interactive cord may be implemented.

This document describes authentication using an interactive cord. An interactive cord includes a cable, and fabric cover that covers the cable. The interactive cord may be implemented as a variety of different types of cords, such as a cord for headphones, earbuds, data transfer, lamps, clocks, radios, fans, and so forth. The fabric cover includes one or more conductive threads woven into the fabric cover to form one or more capacitive touchpoints which are configured to enable reception of touch input that causes a change in capacitance to the one or more conductive threads. A controller, implemented at the interactive cord or a computing device coupled to the interactive cord, can detect the change in capacitance and trigger one or more functions associated with the one or more capacitive touchpoints. For example, when implemented as a cord for a headset (e.g., headphones or ear buds), the controller can control audio to the headset, such as by playing the audio, pausing the audio, adjusting the volume of the audio, skipping ahead in the audio, skipping backwards in the audio, skipping to additional audio, and so forth.

Creating an interactive cord with capacitive touchpoints integrated into the fabric cover eliminates moving parts, hardware, bulk, unsightliness, and thickness found in existing in-line controls for cords. At the same time, the cost to manufacture the in-line controls is reduced because there are no extra hardware controls that must be electrically connected. Furthermore, the controller can be implemented to detect different types of touches to the capacitive touchpoints (e.g., hard presses versus light taps, pinches, or combinations or sequences of touches) thereby increasing the total number of different functions that can be triggered from the interactive cord. In one or more implementations, the fabric cover acts as an RF shield for the cable, thereby reducing the need to manufacture the cord with a separate RF shield. Doing so further reduces the cost and complexity of manufacturing the interactive cord.

In one or more implementations, the interactive cord can be used to authenticate a user. For example, rather than using a password entered into a computing device, a touch input pattern can be provided to interactive cord that is coupled to the computing device to authenticate the user. A variety of different types of touch input patterns are contemplated, including by way of example and not limitation, tapping the capacitive touch points with a particular rhythm, touching absolute positions of capacitive touchpoints on the fabric cover, touching relative positions of capacitive touchpoints on the fabric cover, applying a particular amount of pressure to the capacitive touchpoints on the fabric cover, sliding from one capacitive touchpoint to another capacitive touchpoint, touching multiple capacitive touchpoints at substantially the same time, or causing one capacitive touchpoint to touch one or more other capacitive touchpoints.

This method of authentication adds an increased level of security to the interactive cord. Furthermore, since this type of authentication is unexpected, it is less likely to be compromised by adversaries and those with malicious intent. For example, a bystander would have a low probability of recognizing and repeating the authentication sequence provided to the interactive cord.

Example Environment

FIG. 1 is an illustration of an example environment 100 in which techniques using, and objects including, an interactive cord may be implemented. Environment 100 includes an interactive cord 102, which is illustrated as a cord for a headset. While interactive cord 102 will be described as a cord for a headset, such as earbuds or headphones, it is to be noted that interactive cord 102 may be utilized for various different types of uses, such as cords for appliances (e.g., lamps or fans), USB cords, SATA cords, data transfer cords, power cords, or any other type of cord that is used to transfer data or media.

Figure 2:
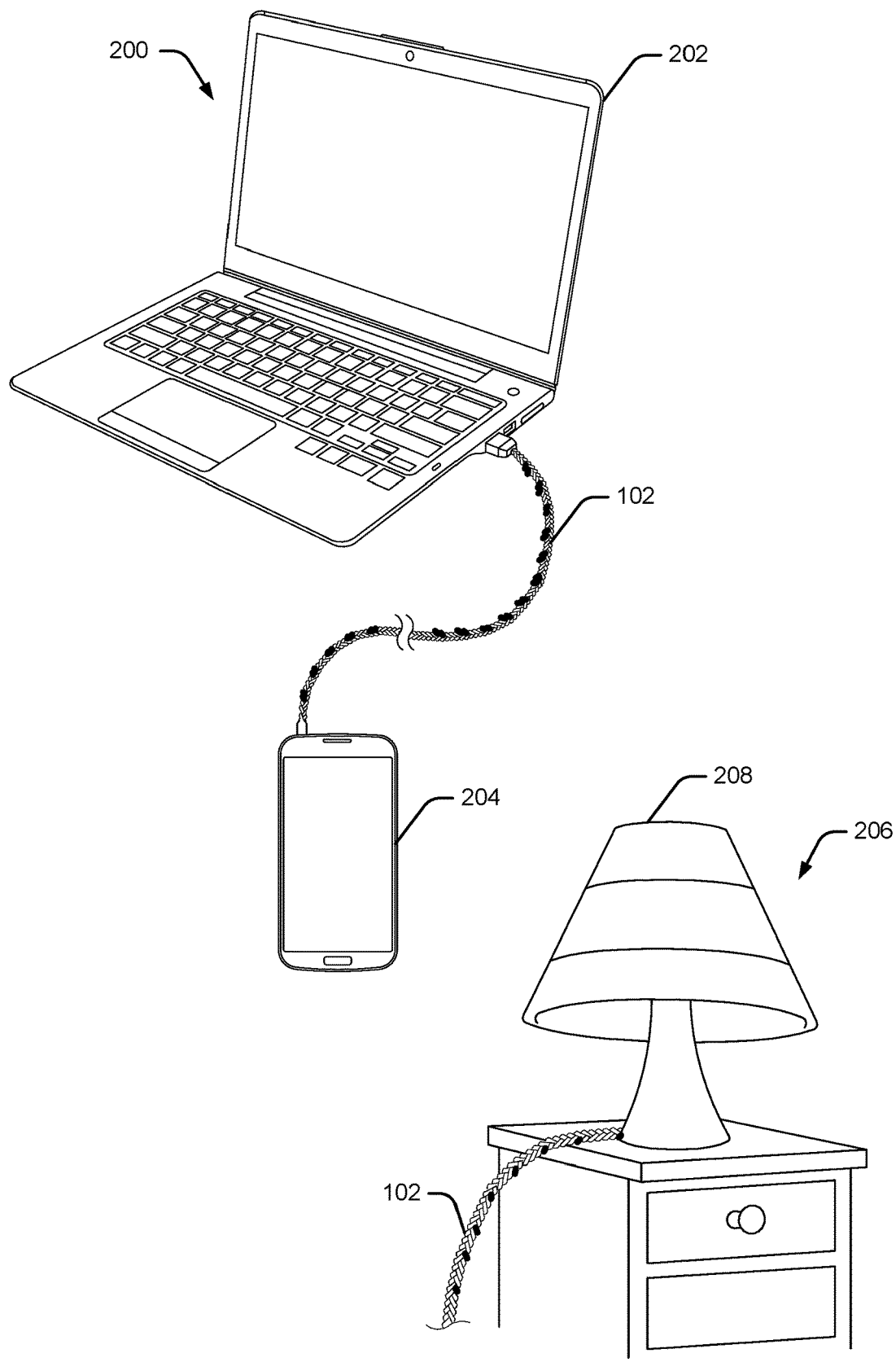
FIG. 2 illustrates additional environments in which an interactive cord may be implemented.

Consider, for example, FIG. 2 which illustrates additional environments in which interactive cord 102 can be implemented. At an environment 200, interactive cord 102 is implemented as a data transfer cord configured to transfer data (e.g., media files) between a computer 202 and a mobile device 204. In this example, interactive cord 102 may be configured to receive touch input usable to initiate the transfer, or pause the transfer, of data between computer 202 and mobile device 204.

As another example, at an environment 206, interactive cord 102 is illustrated as a power cord for a lamp 208. In this example, interactive cord 102 may be configured to receive touch input usable to turn on and off the lamp and/or to adjust the brightness of the lamp.

Returning to FIG. 1, interactive cord 102 includes a fabric cover 104 which is configured to cover a cable 106 of interactive cord 102. In FIG. 1, a cutaway shows an example of fabric cover 104 and cable 106 beneath the cover. In this example, cable 106 is configured to communicate audio data to headset. In other implementations, however, cable 106 is can be implemented to transfer power, data, and so forth.

Instead of using separate hardware controls, fabric cover 104 is configured to sense touch input using capacitive sensing. To do so, fabric cover 104 includes one or more conductive threads 108 that are woven, braided, or otherwise integrated with the fabric of fabric cover 104. Generally, conductive thread 108 corresponds to thread that is flexible, but includes a wire that changes capacitance in response to human input. For example, when a finger of a user's hand approaches conductive thread 108, the finger causes the capacitance of conductive thread 108 to change.

Figure 3:
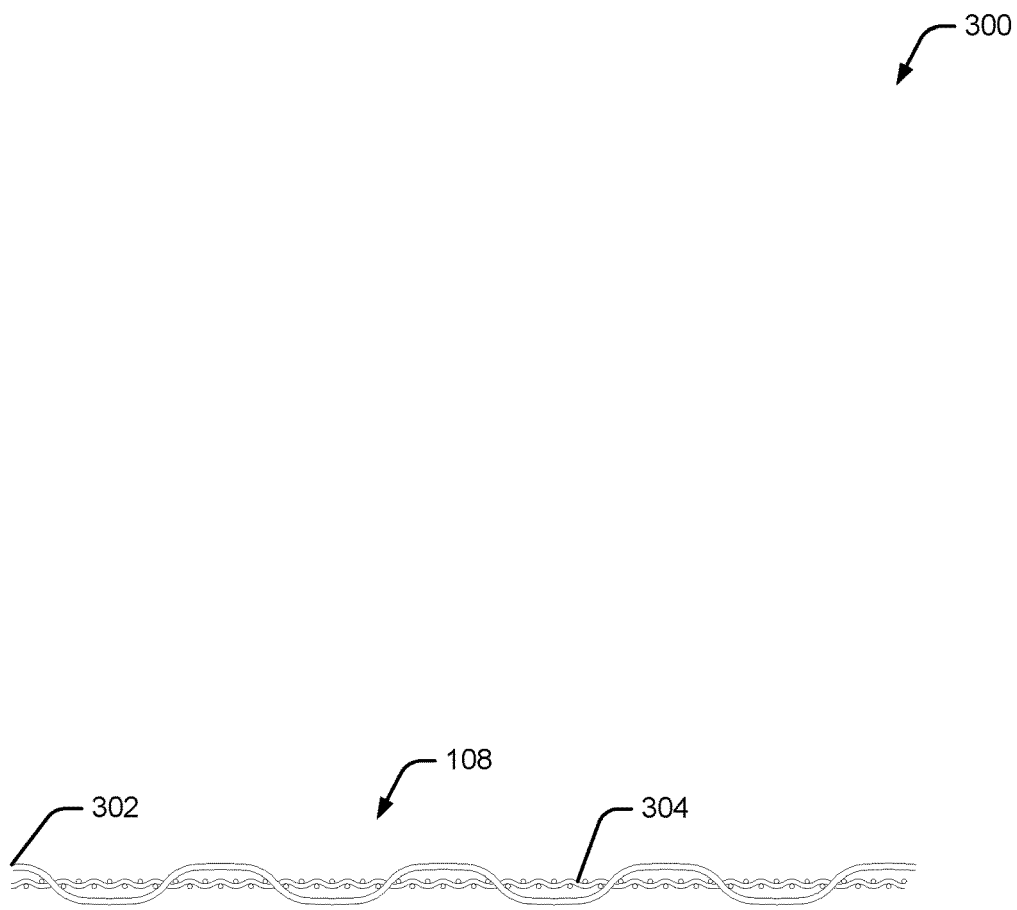
FIG. 3 illustrates an example of a conductive thread in accordance with one or more implementations.

Consider, for example, FIG. 3 which illustrates an example 300 of conductive thread 108 in accordance with one or more implementations. In this example, conductive thread 108 includes a conductive wire 302 that is combined with one or more flexible threads 304. Conductive wire 302 may be combined with flexible threads 304 in a variety of different ways, such as by twisting flexible threads 304 with conductive wire 302, wrapping flexible threads 304 with conductive wire 302, braiding or weaving flexible threads 304 to form a cover that covers conductive wire 302, and so forth. Conductive wire 302 may be implemented using a variety of different conductive materials, such as copper, silver, gold, aluminum, or other materials coated with a conductive polymer. Flexible thread 304 may be implemented as any type of flexible thread or fiber, such as cotton, wool, silk, nylon, polyester, and so forth.

Combining conductive wire 302 with flexible thread 304 causes conductive thread 108 to be flexible and stretchy, which enables conductive thread 108 to be easily woven with one or more non-conductive threads 110 (e.g., cotton, silk, or polyester) to form fabric cover 104. Alternately, in at least some implementations, fabric cover 104 can be formed using only conductive threads 108.

To enable fabric cover 104 to sense touch input, the fabric cover is constructed with one or more capacitive touchpoints 112. As described herein, capacitive touchpoints 112 correspond to positions on fabric cover 104 that will cause a change in capacitance to conductive thread 108 when a user's finger touches, or comes in close contact with, capacitive touchpoint 112.

In one or more implementations, the weave pattern of fabric cover 104 exposes conductive thread 108 at the capacitive touchpoints 112. In FIG. 1, for example, conductive thread 108 is exposed at capacitive touchpoints 112, but is otherwise not visible. In some implementations, two or more conductive threads 108 may be substantially parallel to each other at capacitive touchpoints 112, but twisted together at other areas of fabric cover 104. The various ways in which capacitive touchpoints 112 can be integrated within fabric cover 104 are discussed in greater detail, below, with regards to FIG. 4.

In one or more implementations, capacitive touchpoints 112 are formed with a visual or tactile cue to enable the user to easily recognize the location of the capacitive touchpoint 112. In FIG. 1, for instance, conductive threads 108 are shown as being a different color (black) than the non-conductive threads 110 (white), thereby providing a visual cue to the user as to where the capacitive touchpoint is located.

In environment 100, interactive cord 102 includes earbuds 114 and a connector 116 that is configured to be plugged into a computing device 118. Computing device 118 is illustrated as a mobile phone, but may also be configured as a desktop computer, a laptop computer, a tablet device, a wearable device, and so forth. Thus, computing device 118 may range from full resource devices with substantial memory and processor resources (e.g., personal computers, game consoles) to low-resource devices with limited memory and/or processing resources (e.g., mobile devices).

Computing device 118 is illustrated as including a controller 120 which is representative of functionality to sense touch input to capacitive touchpoints 112 of interactive cord 102, and to trigger various functions based on the touch input. For example, when interactive cord 102 is implemented as a cord for a headset, controller 120 can be configured to, in response to touch input to capacitive touchpoints 112, start playback of audio to the headset, pause audio, skip to a new audio file, adjust the volume of the audio, and so forth. In FIG. 1 controller 120 is illustrated as being implemented at computing device 118, however, in alternate implementations, controller 120 may be integrated within interactive cord 102, or implemented with another device, such as powered headphones, a lamp, a clock, and so forth.

Having discussed an example environment 100 in which interactive cord 102 may be implemented, consider now a more-detailed discussion of fabric cover 104.

Fabric cover 104 may be formed in a variety of different ways. In one or more implementations, the weave pattern of fabric cover 104 causes conductive threads 108 to be exposed at capacitive touchpoints 112, but covered and hidden from view at other areas of fabric cover 104.

Figure 4:
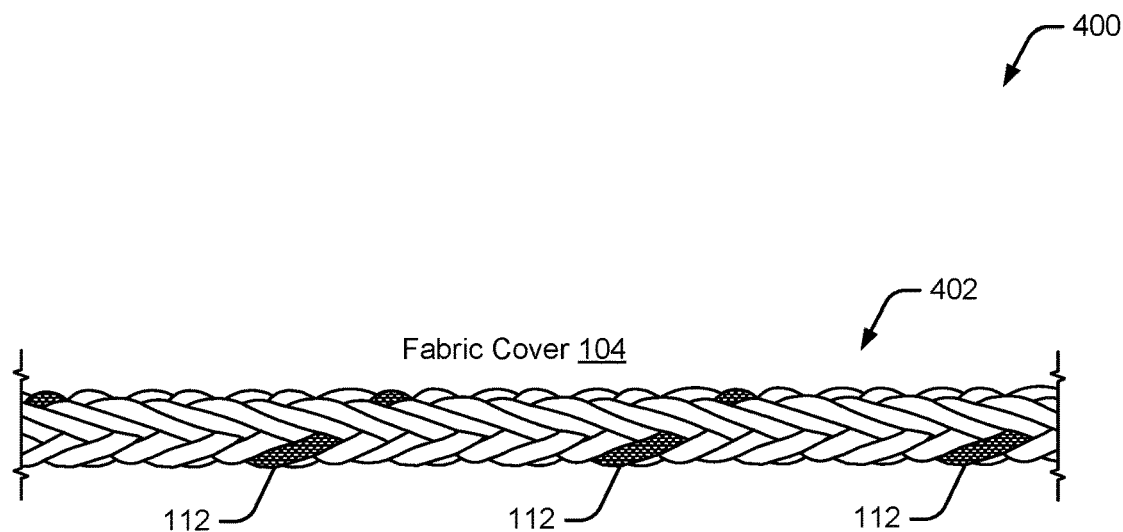
FIG. 4 illustrates examples of a fabric cover in accordance with one or more implementations.
Figure 4:
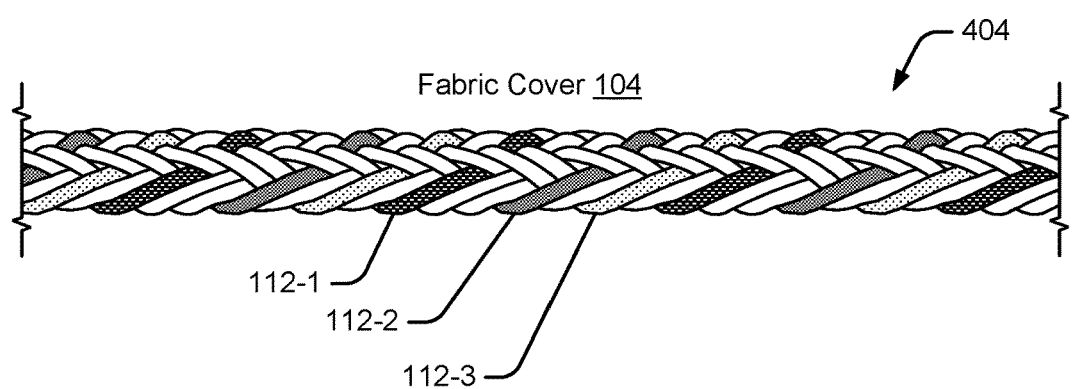

Consider, for example, FIG. 4 which illustrates examples 400 of fabric cover 104 in accordance with one or more implementations. In a first example, at 402, fabric cover 104 includes a single conductive thread, or single set of conductive threads 108, woven with non-conductive threads 110, to form capacitive touchpoints 112. Notably, the one or more conductive threads 108 correspond to a first color (black) which is different than a second color (white) of non-conductive threads 110 woven into the fabric cover.

In this example, the weave pattern of fabric cover 104 exposes conductive thread 108 at capacitive touchpoints 112 along fabric cover 104. However, conductive thread 108 is covered and hidden from view at other areas of fabric cover 104. Touch input to any of capacitive touchpoints 112 causes a change in capacitance to conductive thread 108, which may be detected by controller 120. However, touch input to other areas of fabric cover 104 formed by non-conductive thread 110 does not cause a change in capacitance to conductive thread 108.

In one or more implementations, fabric cover 104 includes at least a first conductive thread 108 and a second conductive thread 108. The first conductive thread 108 is substantially parallel to the second conductive thread at one or more capacitive touchpoints 112 of fabric cover 104, but twisted with second conductive thread 108 at other areas of fabric cover 104. Capacitive touchpoints 112 are formed at the areas of fabric cover 104 at which the first and second conductive threads are parallel to each other because bringing a finger close to capacitive touchpoints 112 will cause a difference in capacitance that can be detected by controller 120. However, in the regions where conductive threads 108 are twisted, the closeness of the finger to conductive threads 108 has equal effect on the capacitance of both conductive threads 108, which avoids false triggering if the user touches the conductive thread 108. Notably, therefore, conductive thread 108 may not need to be covered by non-conductive thread 110 in this implementation.

Visual cues can be formed within fabric cover 104 to provide an indication to the user as to where to touch interactive cord 102 to initiate various functions. In one or more implementations, conductive threads 108 correspond to one or more first colors which are different than one or more second colors of non-conductive threads 110 woven into fabric cover 104. For example, at 402, the color of conductive thread 108 is black, whereas the remainder of the fabric cover is white, which enables the user to recognize where to touch fabric cover 104. Alternately or additionally, the one or more conductive threads 108 can be woven into fabric cover 104 to create one or more tactile capacitive touchpoints by knitting or weaving of the thread to create a tactile cue that can be felt by the user. For example, capacitive touchpoints 112 can be formed to protrude slightly from fabric cover 104 in a way that can be felt by the user when touching interactive cord 102.

In the example fabric cover 104 illustrated at 402, controller 120 is able to detect touch input to the various capacitive touchpoints 112. However, controller 120 may be unable to distinguish touch input to a first capacitive touchpoint 112 from touch input to a second, different, capacitive touchpoint 112. In this implementation, therefore, the number of functions that can be triggered using interactive cord 102 is limited.

However, capacitive touchpoints 112 that are electrically distinct can be made by incorporating multiple sets of conductive threads 108 into fabric cover 104 to create multiple different capacitive touchpoints 112 which can be distinguished by controller 120. For example, fabric cover 104 may include one or more first conductive threads 108 and one or more second conductive threads 108. The one or more first conductive threads 108 can be woven into fabric cover 104 such that the one or more first conductive threads 108 are exposed at one or more first capacitive touchpoints 112, and the one or more second conductive threads 108 can be woven into fabric cover 104 such that the one or more second conductive threads 108 are exposed at one or more second capacitive touchpoints 112. Doing so enables controller 120 to distinguish touch input to the one or more first capacitive touchpoints 112 from touch input to the one or more second capacitive touchpoints 112.

As an example, at 404 fabric cover 104 is illustrated as including multiple electrically distinct capacitive touchpoints 112, which are visually distinguished from each other by using threads of different colors and/or patterns. For example, a first set of conductive thread is colored black with dots to form capacitive touchpoints 112-1, a second set of conductive thread is gray with dots to form capacitive touchpoints 112-2, and a third set of conductive thread is colored white with dots to form capacitive touchpoints 112-3. The weaving pattern of fabric cover 104 surfaces capacitive touchpoints 112-1, 112-2, and 112-3 at regular intervals along fabric cover 104 of interactive cord 102.

In this case, each of the different capacitive touchpoints 112-1, 112-2, and 112-3 may be associated with a different function. For example, the user may be able to touch capacitive touchpoint 112-1 to trigger a first function (e.g., playing or pausing a song), touch capacitive touchpoint 112-2 to trigger a second function (e.g., adjusting the volume of the song), and touch capacitive touchpoint 112-3 to trigger a third function (e.g., skipping to a next song).

In some cases, a combination, sequence, or pattern of touches to capacitive touchpoints 112 may trigger different functions. For example, the user may be able to touch capacitive touchpoints 112-1 and 112-2 at the same time in order to trigger a fourth function (e.g., fast forwarding the song).

Fabric cover 104 can be formed using a variety of different weaving or braiding techniques. In example 404, fabric cover 104 is formed by weaving the one or more conductive threads into fabric cover 104 using a loop braiding technique. Doing so causes the one or more capacitive touchpoints to be formed by one or more split loops. In example 404, fabric cover 104 includes 3 different split loops, one for each of the three different types of conductive threads to form capacitive touchpoints 112-1, 112-2, and 112-3. The split loops are placed at particular locations in the pattern to provide isolation between the conductive threads and align them in a particular way. Doing so produces a hollow braid in mixed tabby, and 3/1 twill construction. This gives columns ("wales") along the length of the braid which exposes lengths of the different fibers. This pattern ensures that each of the conductive threads 108 are in an isolated conductive area, which enables controller 120 to easily detect which conductive thread 108 is being touched, and which is not, at any given time.

Audio signals are particularly vulnerable to RF interference. Thus, cords for headsets, cable TV, and other types of audio/visual wiring often contain foil or stranded wire wrapped around the signal conductors to protect the signal from radio frequency interference and to provide an electrical ground. Headset cords and other media cords also often have a woven fabric outer layer to provide some physical protection to the electrical cords, to help avoid tangling, and to improve the feel and appearance of the wires.

Thus, in one or more implementations, fabric cover 104 acts as an RF shield for cable 106, thereby reducing the need to manufacture interactive cord 102 with a separate RF shield. In addition, fabric cover 104 creates an attractive and protective covering for interactive cord 102 that also helps to prevent tangling.

Having discussed various examples of fabric cover 104, consider now a more-detailed discussion of how controller 120 detects touch input to fabric cover 104 to trigger various functions.

Generally, controller 120 is configured to monitor the one or more conductive threads 108 of fabric cover 104 to detect a change in capacitance to conductive threads 108 which corresponds to touch input to capacitive touchpoints 112.

Figure 5:
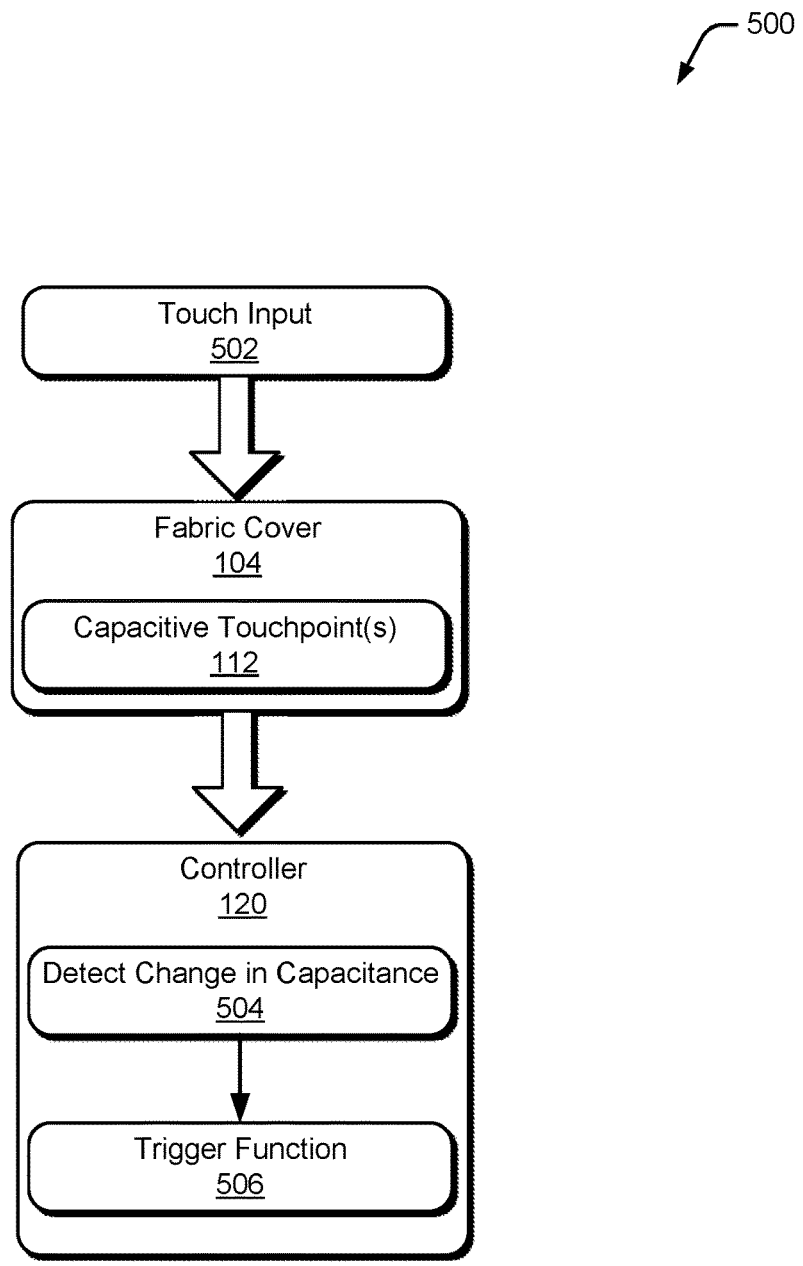
FIG. 5 illustrates an example system configured to detect touch input to a capacitive touchpoint of a fabric cover.

FIG. 5 illustrates an example system 500 configured to detect touch input to a capacitive touchpoint of a fabric cover. In system 500, touch input 502 is provided to one or more capacitive touchpoints 112 of fabric cover 104.

Figure 6:
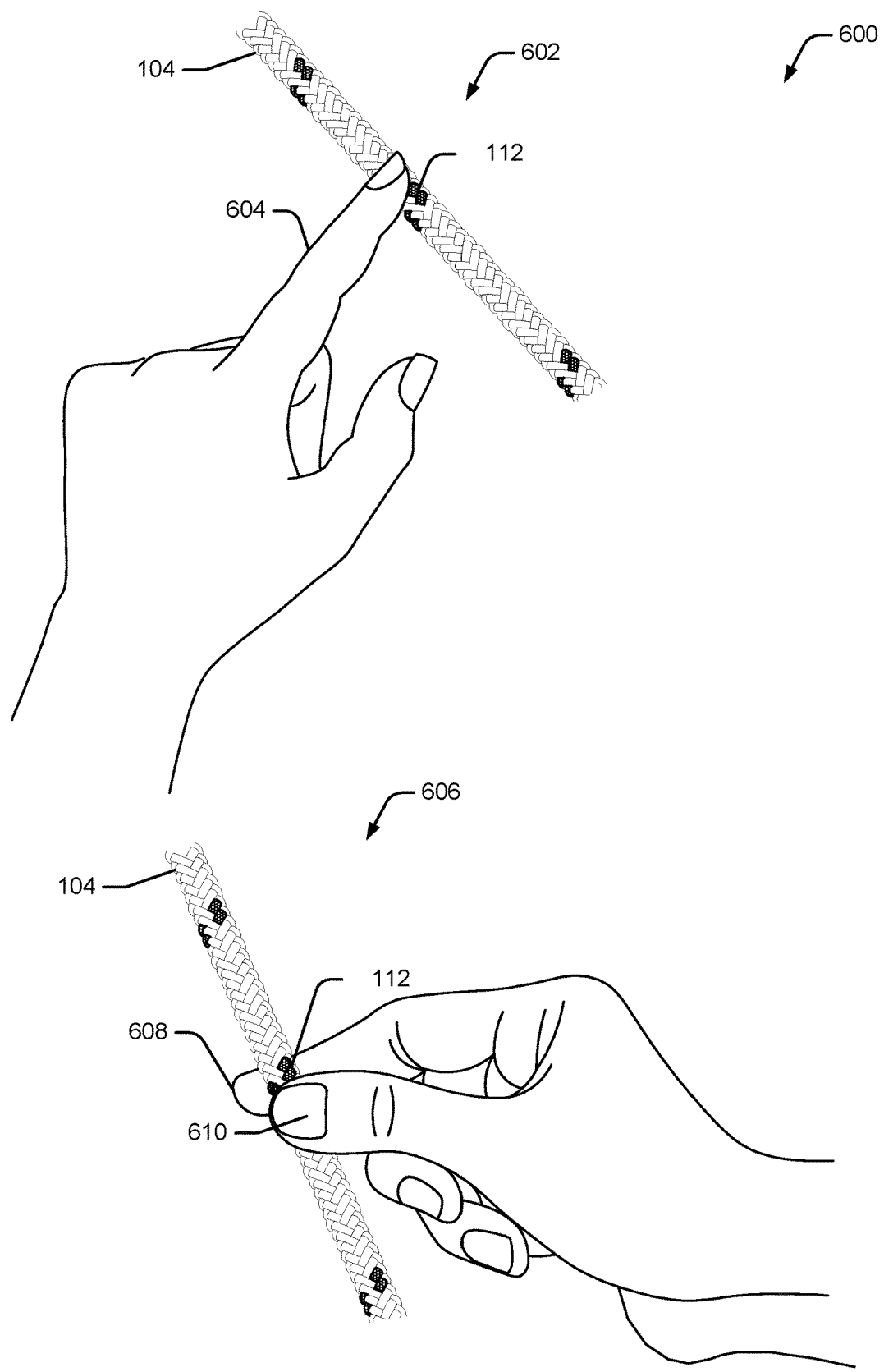
FIG. 6 illustrates examples of providing touch input to a fabric cover of an interactive cord in accordance with one or more implementations.

By way of example, consider FIG. 6, which illustrates examples 600 of providing touch input to a fabric cover of an interactive cord in accordance with one or more implementations. At 602, a finger 604 of a user's hand provides touch input by touching a capacitive touchpoint 112 of fabric cover 104 of interactive cord 102. In some cases, the touch input can be provided by moving finger 604 close to capacitive touchpoint 112 without physically touching the capacitive touchpoint.

A variety of different types of touch input 502 may be provided. In one or more implementations, touch input 502 may correspond to a pattern or series of touches to fabric cover 104, such as by touching a first capacitive touchpoint 112 followed by touching a second capacitive touchpoint 112. In one or more implementations, different types of touch input 502 may be provided based on the amount of pressure applied to capacitive touchpoint 112. As an example, at 606 an index finger 608 and a thumb 610 of the user's hand provides touch input by pinching a capacitive touchpoint 112 of fabric cover 104. Doing so may trigger a function that is different than a function triggered by simply touching or tapping capacitive touchpoint 112. In one or more implementations, a first touch to capacitive touchpoint 112 may cause the controller 120 to generate an audible alert that lets the user know that if a second tap is provided to the same capacitive touchpoint, the touch will be registered. For example, the user might tap a capacitive touchpoint 112, and in response hear a "volume up", indicating that this touchpoint is correlated to turning the volume up. The user may then then squeeze the same touchpoint in order to confirm the volume up command. In this way, the user is less likely to initiate the controls unintentionally.

Returning to FIG. 5, at 504 controller 120 detects a change in capacitance to conductive thread 108, associated with capacitive touchpoint 112, when touch input 502 is provided to capacitive touchpoint 112 of fabric cover 104. To sense touch input 502, controller 120 may use a capacitance meter that can detect the change in capacitance of a single conductive thread or between two conductive threads disposed parallel to each other. Generally, when a finger touches, or comes in close contact to, capacitive touchpoint 112, a capacitance is formed between the finger and the associated conductive thread 108. This capacitance may be detected by the capacitance meter of controller 120 to determine that the touch input has occurred.

Controller 120 may be implemented to detect the change in capacitance in a variety of different ways. In one or more implementations, controller 120 can be implemented to detect a change in capacitance between two conductive threads 112 woven into interactive cord 102. As described above, two conductive threads 108 can be placed parallel or interlaced to each other at capacitive touchpoints 112. In this case, one of the conductive threads 108 can be grounded and the other conductive thread 108 can be connected to the capacitance meter. Initially, the capacitance meter will measure a small baseline capacitance between the two conductive threads. However, when a finger of the user's hand touches the conductive threads at capacitive touchpoint 112, a capacitive coupling occurs with each of the conductive threads 108. In response, the capacitance meter detects a new combined capacitance which is larger than the small baseline capacitance. This change in capacitance enables controller 120 to detect touch input 502.

In one or more implementations, controller 120 can determine the amount of pressure applied to capacitive touchpoint 112, which may enable controller 120 to distinguish a light tap from a hard press or pinch. For example, if the finger is pressed harder, or if two fingers pinch capacitive touchpoint 112, the capacitance meter will detect an even greater capacitance value. Thus, controller 120 can determine whether touch input 502 corresponds to a tap or a pinch by comparing the detected capacitance to predetermined capacitance thresholds for a touch or pinch.

In one or more implementations, controller 120 can be implemented to monitor and detect the change in capacitance of a single conductive thread 108 woven into interactive cord 102. In this case, the single conductive thread 108 is not grounded. When not being touched, only a small baseline capacitance exists which may be monitored by the capacitance meter. When a user's finger comes in the vicinity of the conductive thread 108, however, a touch-input capacitance is formed between the fingertip and the conductive thread. This capacitance is electrically connected in parallel to the baseline capacitance, causing the capacitance meter to detect the touch input. Similar to when the capacitance is measured between two conductive threads, a stronger pressing will create a larger capacitance. This method may be more resistant to false touches due to moisture (e.g., rain or sweat) permeating fabric cover 104.

At 506, in response to detecting the change in capacitance, controller 120 triggers a function associated with touch input 502. Notably, controller 120 can trigger a variety of different types of functions based on the how interactive cord 102 is being utilized. For example, when interactive cord 102 corresponds to a cord for a headset, controller 120 may trigger functions such as playing audio (e.g., a song, video, audiobook file, or voice memo), pausing audio, fast forwarding audio, skipping to a next audio track, adjusting the volume of the audio, and so forth. As another example, when interactive cord corresponds to a data transfer cord, controller 120 may trigger functions such as starting the transfer of data, stopping the transfer of data, authenticating the user to enable the transfer of data, and so forth. When interactive cord 102 corresponds to a cord for an appliance (e.g., a lamp, a fan, or an alarm clock), controller 120 may trigger functions such as turning on or off the appliance, adjusting the brightness of a lamp, adjusting the speed of a fan, hitting the snooze button on an alarm clock, and so forth.

As described throughout, different functions may be mapped to different types of touch input to fabric cover 104 of interactive cord 102. In some cases, a specific function may be associated with a specific capacitive touchpoint 112. For instance, in example 404 of FIG. 4, the user may be able to touch first capacitive touchpoint 112-1 to trigger a first function (e.g., playing or pausing a song), touch second capacitive touchpoint 112-2 to trigger a second function (e.g., adjusting the volume of the song), and touch third capacitive touchpoint 112-3 to trigger a third function (e.g., skipping to a next song).

In some cases, functions may be associated with various combinations, sequences, or patterns of touch input to multiple touchpoints. For example, a function may be associated with first touching capacitive touchpoint 112-1, and then sliding the user's finger to second capacitive touchpoint 112-2.

In some cases, the function that is triggered may be based on the pressure applied to capacitive touchpoints 112. For example, a first function may be associated with tapping a capacitive touchpoint 112, and a second function may be associated with squeezing or pinching the same capacitive touchpoint.

In one or more implementations, interactive cord 102 can be used to authenticate a user. For example, rather than requiring a password to be entered into a computing device, a touch input pattern can be provided to interactive cord 102 to authenticate the user.

Figure 7:
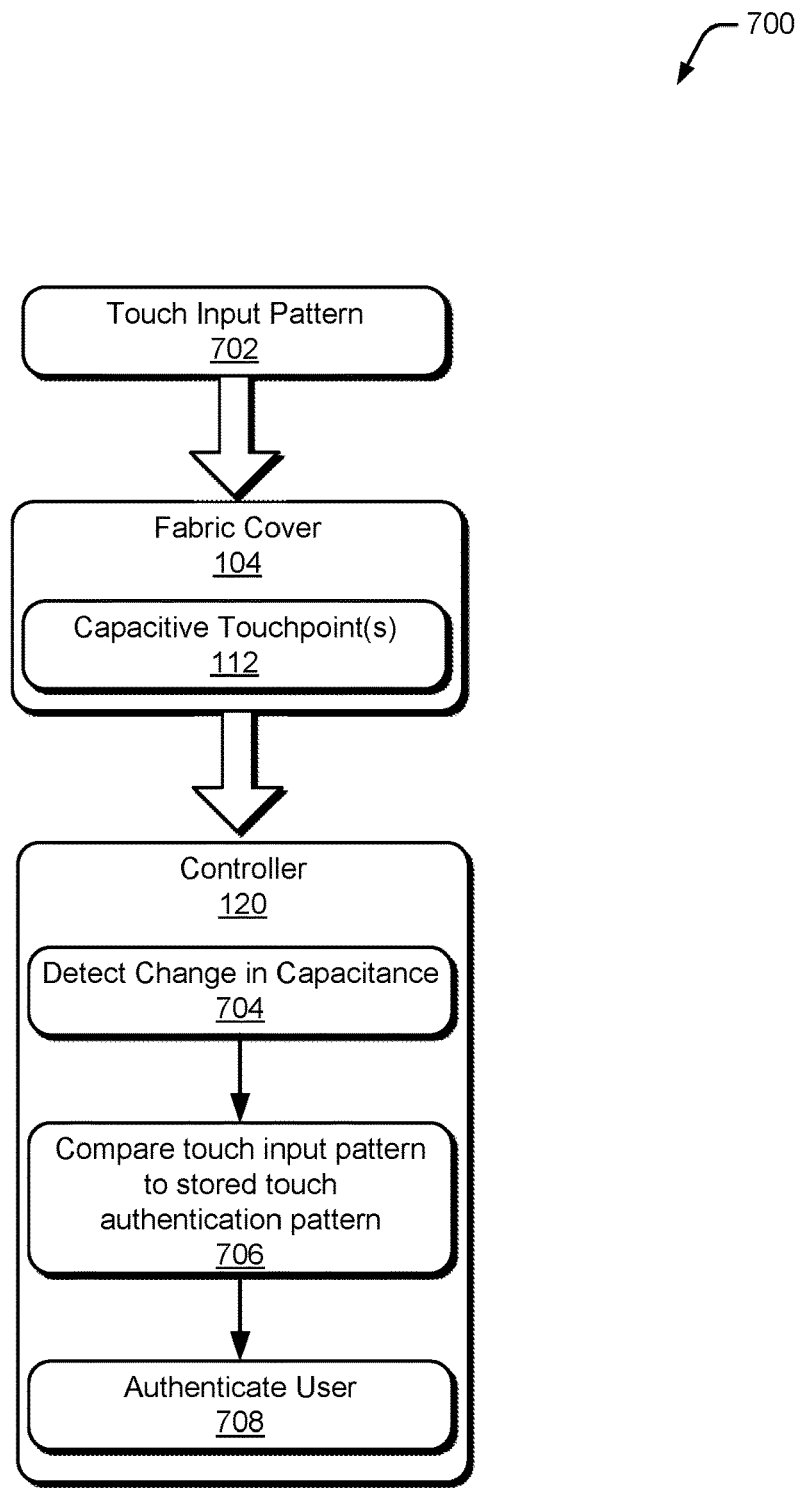
FIG. 7 illustrates an example system for using an interactive cord to authenticate a user.

Consider, for example, FIG. 7 which illustrates an example system 700 for using an interactive cord to authenticate a user. In system 700, a touch input pattern 702 is provided to one or more capacitive touchpoints 112 of fabric cover 104. For example, a finger of a user's hand can provide touch input pattern 702 by touching, or moving close to, one or more capacitive touchpoint 112 of fabric cover 104 of interactive cord 102. Touch input pattern 702 may be provided in response to a request for authentication, which may be initiated by controller 120 when interactive cord 102 is plugged in to computing device 118, or any time that computing device 118 is locked.

At 704, controller 120 recognizes the touch input pattern by detecting a change in capacitance to conductive thread 108, associated with the one or more capacitive touchpoints 112 of fabric cover 104. Controller 120 can detect the change in capacitance using similar techniques as those described above with regards to FIGS. 5 and 6.

At 706, controller 120 compares the detected touch input pattern 702 to a stored touch authentication pattern associated with an authenticated user state, and at 708, controller 120 authenticates the user if the detected touch input pattern 702 matches the stored touch authentication pattern. For example, the user may have previously provided touch authentication pattern to controller 120 by providing touch input to fabric cover 104 of interactive cord 102. Thus, controller 120 determines whether the detected touch input pattern 702 matches the stored touch authentication pattern. If controller 120 determines a match, then the user is authenticated. In one more implementations, the user may remain authenticated until expiration of a timeout, removal of interactive cord 102 from computing device 118, or by removing interactive cord 102 from the body (e.g., removing earbuds from the user's ear).

Controller 120 is configured to recognize a variety of different types of touch input patterns 702. In one or more implementations, touch input pattern 702 includes tapping one or more capacitive touchpoints 112 with a particular rhythm. For example, the user can tap one or more capacitive touchpoints 112 with a specific rhythm, such as a rhythm corresponding to a certain beat or song.

Alternately or additionally, touch input pattern 702 may include touching absolute positions of capacitive touchpoints 112 on fabric cover 104. For example, the user can touch multiple different ones of the capacitive touchpoints in a specific sequence. In FIG. 4, for example, the user could touch capacitive touchpoint 112-2, then capacitive touchpoint 112-1, and finally capacitive touchpoint 112-3.

Alternately or additionally, touch input pattern 702 may include touching relative positions of capacitive touchpoints 112 on fabric cover 104. For example, rather than touching specific capacitive touchpoints 112, the user could touch a first capacitive touchpoint 112, then touch a second capacitive touchpoint 112 that is positioned below the first capacitive touchpoint on fabric cover 104, and then touch a third capacitive touchpoint 112 that is positioned between the first and second capacitive touchpoints 112.

Alternately or additionally, touch input pattern 702 may include applying a particular amount of pressure to the capacitive touchpoints 112 on fabric cover 104. For example, the user could apply different types of pressure to capacitive touchpoints 112, such as by pinching the capacitive touchpoint 112.

Alternately or additionally, touch input pattern 702 may include sliding from one capacitive touchpoint 112 to another capacitive touchpoint. For instance, in FIG. 4, the user could first touch capacitive touchpoint 112-1 and then slide their finger to capacitive touchpoint 112-3 along fabric cover 104.

Alternately or additionally, touch input pattern 702 may include touching multiple capacitive touchpoints 112 at substantially the same time. For example, the user could touch specific capacitive touchpoints 112 at the same. Alternately, the user could grab interactive cord 102 with a specific handgrip that would have the effect of touching multiple different capacitive touchpoints 112.

Alternately or additionally, touch input pattern 702 may include causing one capacitive touchpoint 112 to touch one or more other capacitive touchpoints 112. For example, the user could bend interactive cord 102 such that a first capacitive touchpoint 112 makes contact with a second capacitive touchpoint 112.

Notably, the aforementioned techniques for providing touch input pattern 702 may be combined in different ways for authentication based on the level of security and/or the preferences of the user.

Interactive cord 102 may be used to authenticate the user in a variety of different scenarios. When interactive cord 102 is implemented as a cord for a headset, touch input pattern 702 may be used to authenticate the user to listen to audio using the headset. For example, assume that a user of a smart phone wishes to access audio of a sensitive internal meeting. In this case, when interactive cord 102 is implemented as a cord for a headset that is plugged into the smart phone, a touch input pattern 702 can be required to log in to a secure area of the mobile phone which contains the sensitive audio. As another example, users often need to backup or copy sensitive data from one device to another. In this scenario, interactive cord 102 may be implemented as a data transfer cord that prevents unauthorized copying of data. Thus, in order to copy data from one device to another, the user would need to provide the correct touch input pattern 702 to the data transfer cord. As another example, parents often want to prevent their children from accessing stored or live media. In this scenario, the user could be unable to access certain stored or live media without providing the correct touch input pattern to interactive cord 102 of their headphones or earbuds.

Example Methods

Figure 8:
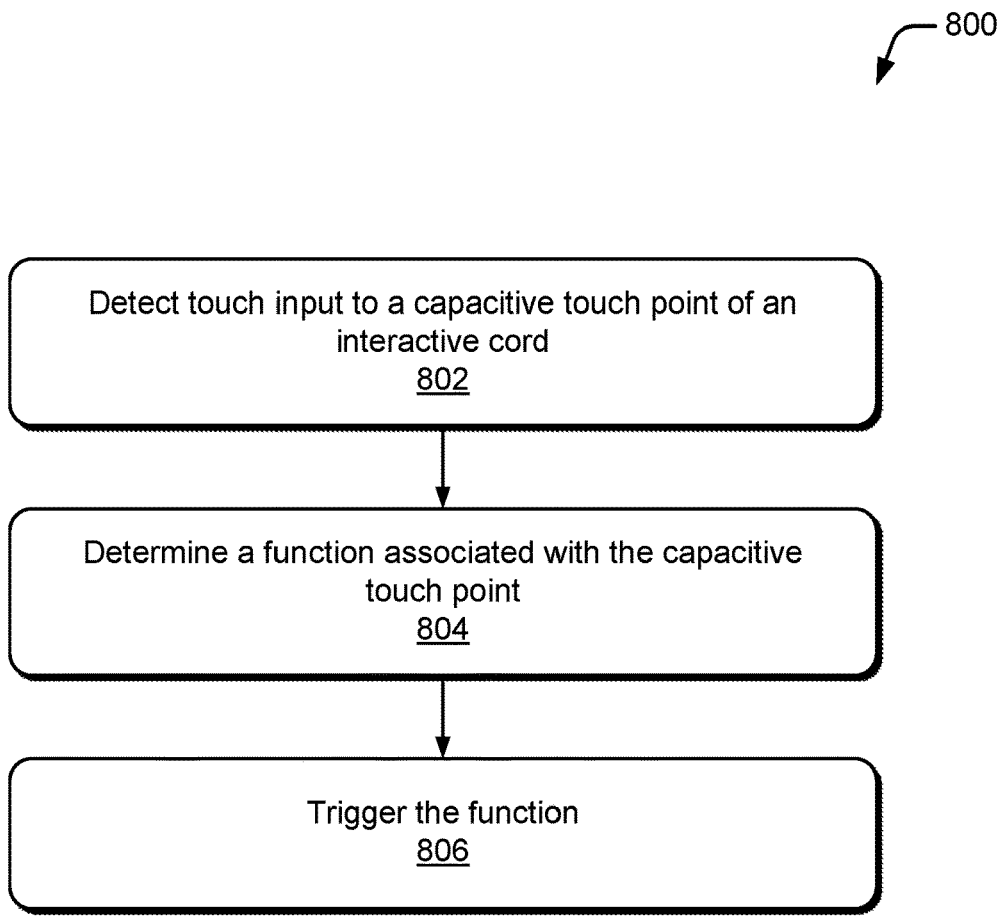
FIG. 8 illustrates an example method of triggering a function based on touch input to a capacitive touchpoint of an interactive cord.
Figure 9:
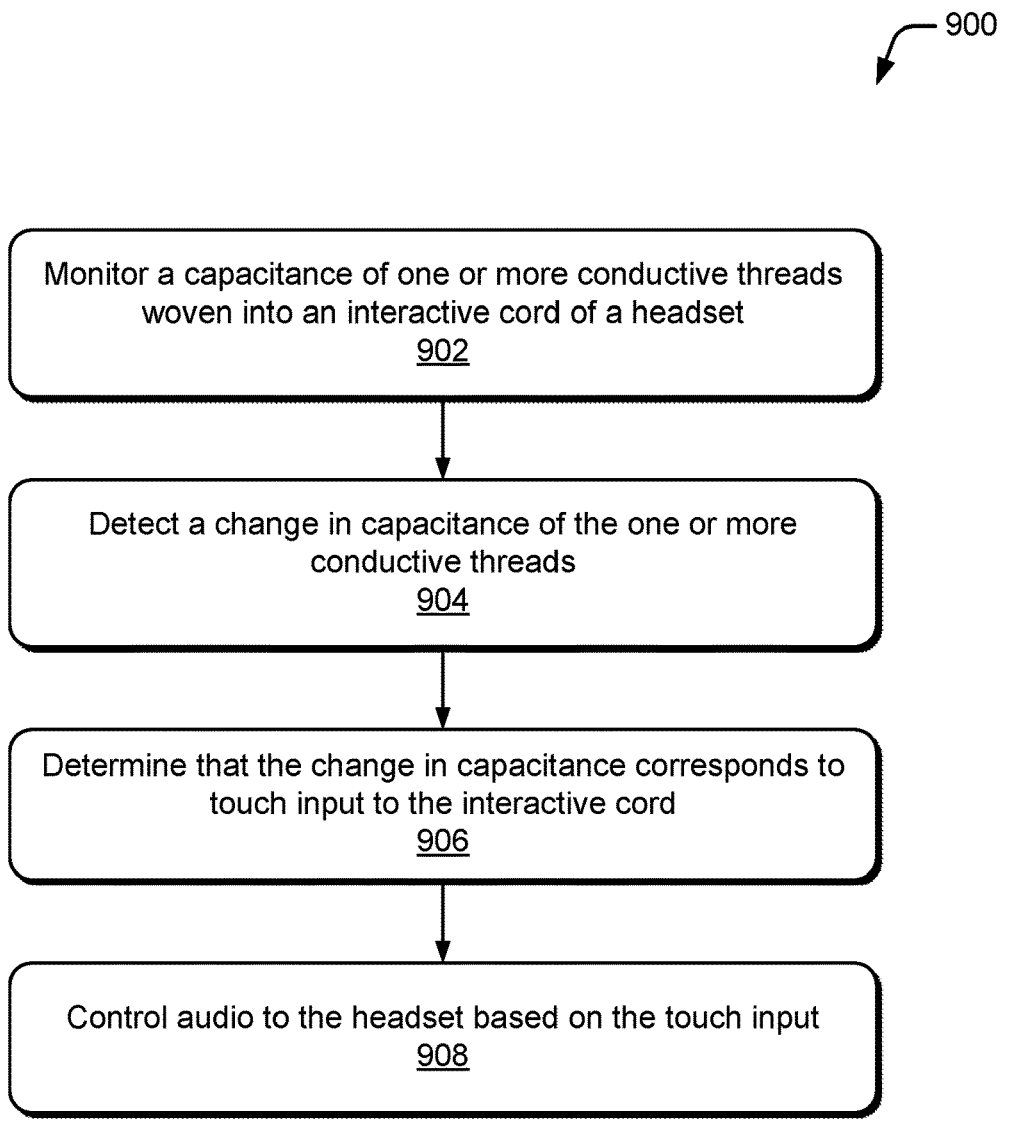
FIG. 9 illustrates an example method of controlling audio to a headset based on touch input to an interactive cord of the headset.
Figure 10:
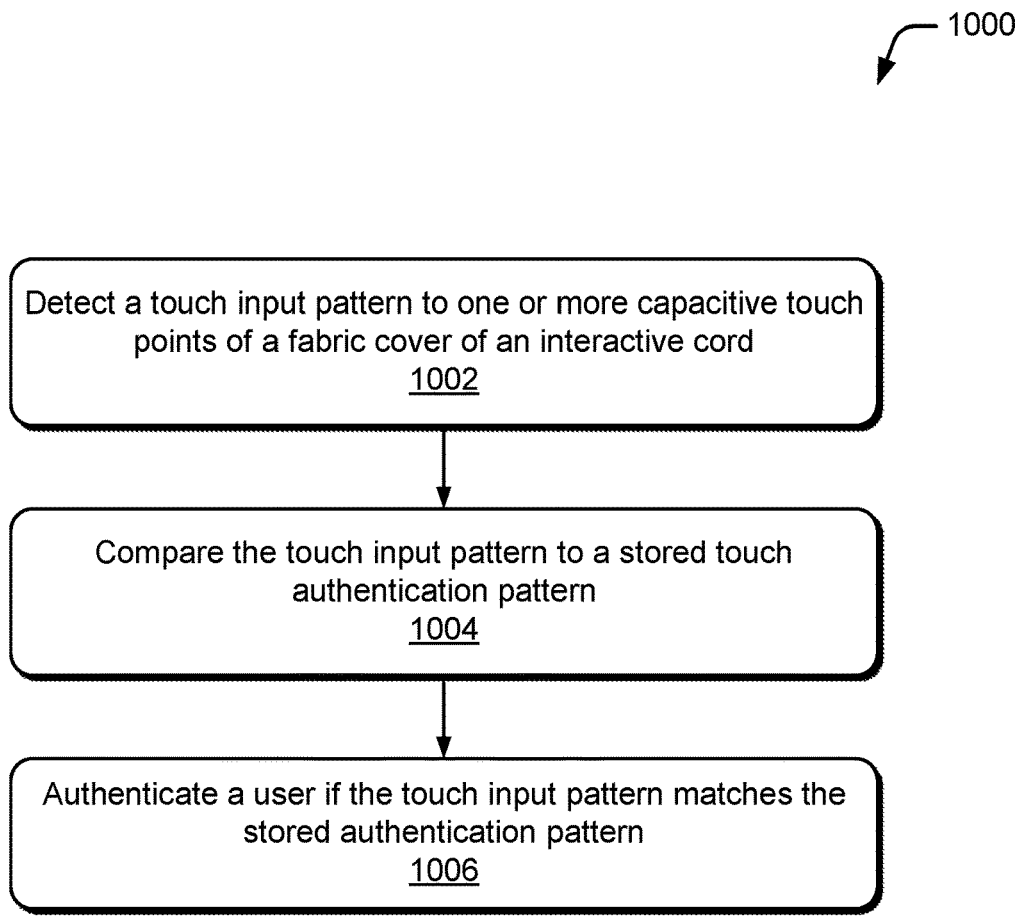
FIG. 10 illustrates an example method of authenticating a user based on a touch input pattern provided to an interactive cord.

FIGS. 8, 9, and 10 illustrate an example method 800 (FIG. 8) of triggering a function based on touch input to a capacitive touchpoint of an interactive cord, an example method 900 (FIG. 9) of controlling audio to a headset based on touch input to an interactive cord of the headset, and an example method 1000 (FIG. 10) of authenticating a user based on a touch input pattern provided to an interactive cord. These methods and other methods herein are shown as sets of blocks that specify operations performed but are not necessarily limited to the order or combinations shown for performing the operations by the respective blocks. The techniques are not limited to performance by one entity or multiple entities operating on one device.

FIG. 8 illustrates an example method 800 of triggering a function based on touch input to a capacitive touchpoint of an interactive cord.

At 802, touch input to a capacitive touchpoint of an interactive cord is detected. For example, controller 120 (FIG. 1) detects touch input 502 to capacitive touchpoint 112 of interactive cord 102 when an object, such as a user's finger, touches capacitive touchpoint 112.

At 804, a function associated with the capacitive touchpoint is determined. For example, controller 120 determines a function associated with the capacitive touchpoint 112 that received the touch input at step 802.

At 806, the function is triggered. For example, controller 120 triggers the function determined at step 804.

FIG. 9 illustrates an example method 900 of controlling audio to a headset based on touch input to an interactive cord of the headset.

At 902, a capacitance of one or more conductive threads woven into an interactive cord of a headset is monitored. For example, controller 120 monitors a capacitance of one or more conductive threads 108 woven into a fabric cover 104 of interactive cord 102.

At 904, a change in capacitance to the one or more conductive threads is detected. For example, controller 120 detects a change in the capacitance of the one or more conductive threads 108.

At 906, it is determined that the change in capacitance corresponds to touch input to the interactive cord. For example, controller 120 determines that the change in capacitance detected at step 904 corresponds to touch input 502 to interactive cord 102.

At 908, audio to the headset is controlled based on the touch input. For example, controller 120 controls audio to a headset based on touch input 502.

FIG. 10 illustrates an example method 1000 of authenticating a user based on a touch input pattern provided to an interactive cord.

At 1002, a touch input pattern to one or more capacitive touchpoints of a fabric cover of an interactive cord is detected. For example, controller 120 detects touch input pattern 702 to one or more capacitive touchpoints 112 of a fabric cover 104 of interactive cord 102. A variety of different types of touch input patterns are contemplated, including by way of example and not limitation, tapping the capacitive touch points with a particular rhythm, touching absolute positions of capacitive touchpoints on the fabric cover, touching relative positions of capacitive touchpoints on the fabric cover, applying a particular amount of pressure to the capacitive touchpoints on the fabric cover, sliding from one capacitive touchpoint to another capacitive touchpoint, touching multiple capacitive touchpoints at substantially the same time, or causing one capacitive touchpoint to touch one or more other capacitive touchpoints.

At 1004, the touch input pattern is compared to a stored authentication pattern. For example controller 120 compares touch input pattern 702, detected at step 1002, to a stored touch authentication pattern. The stored touch authentication pattern may have been previously provided by the user.

At 1006, a user is authenticated if the touch input pattern matches the stored authentication pattern. For example, controller 120 authenticates the user if touch input pattern 702, detected at step 1002, matches the stored authentication pattern.

Example Computing System

Figure 11:
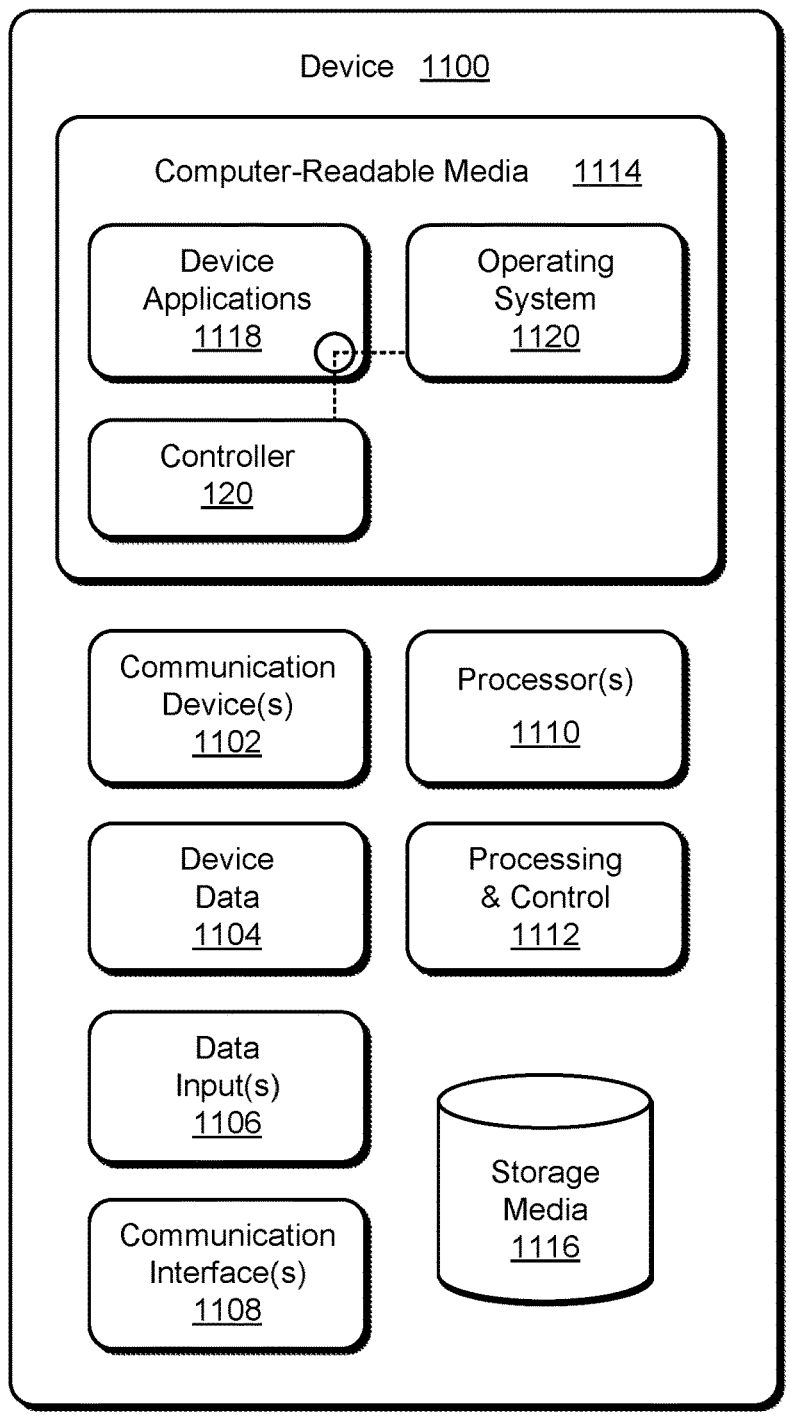
FIG. 11 illustrates various components of an example computing system that can be implemented as any type of client, server, and/or computing device as described with reference to the previous FIGS. 1-10 to implement an interactive cord.

FIG. 11 illustrates various components of an example computing system 1100 that can be implemented as any type of client, server, and/or computing device as described with reference to the previous FIGS. 1-11 to implement authentication using an interactive cord. In embodiments, computing system 1100 can be implemented as one or a combination of a wired and/or wireless wearable device, System-on-Chip (SoC), and/or as another type of device or portion thereof. Computing system 1100 may also be associated with a user (e.g., a person) and/or an entity that operates the device such that a device describes logical devices that include users, software, firmware, and/or a combination of devices.

Computing system 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on computing system 1100 can include any type of audio, video, and/or image data. Computing system 1100 includes one or more data inputs 1106 via which any type of data, media content, and/or inputs can be received, such as human utterances, touch data generated by interactive cord 102, user-selectable inputs (explicit or implicit), messages, music, television media content, recorded video content, and any other type of audio, video, and/or image data received from any content and/or data source.

Computing system 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between computing system 1100 and a communication network by which other electronic, computing, and communication devices communicate data with computing system 1100.

Computing system 1100 includes one or more processors 1110 (e.g., any of microprocessors, controllers, and the like), which process various computer-executable instructions to control the operation of computing system 1100 and to enable techniques for, or in which can be embodied, interactive cord. Alternatively or in addition, computing system 1100 can be implemented with any one or combination of hardware, firmware, or fixed logic circuitry that is implemented in connection with processing and control circuits which are generally identified at 1112. Although not shown, computing system 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1100 also includes computer-readable media 1114, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1100 can also include a mass storage media device 1116.

Computer-readable media 1114 provides data storage mechanisms to store device data 1104, as well as various device applications 1118 and any other types of information and/or data related to operational aspects of computing system 1100. For example, an operating system 1120 can be maintained as a computer application with computer-readable media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components, engines, or managers to implement interactive cord. In this example, device applications 1118 include controller 120.

CONCLUSION

Although embodiments of techniques using, and objects including, authentication using an interactive cord have been described in language specific to features and/or methods, it is to be understood that the subject of the appended claims is not necessarily limited to the specific features or methods described. Rather, the specific features and methods are disclosed as example implementations of interactive cord.

What is claimed is:

1. A system comprising:
an interactive cord coupling a first computing device to a second computing device, the interactive cord comprising a fabric cover covering a cable configured to transfer digital content, the fabric cover comprising one or more conductive threads woven into the fabric cover to form capacitive touchpoints on the fabric cover of the interactive cord, the fabric cover having a weaving pattern that surfaces the capacitive touchpoints at intervals along the interactive cord; and
a controller coupled to the interactive cord and configured to control data transfer between the first computing device and the second computing device via the interactive cord, the controller configured to:
    detect a touch input pattern to one or more of the capacitive touchpoints on the fabric cover, the touch input pattern being based on a pattern of changes in capacitance to the one or more of the capacitive touchpoints;
    compare the touch input pattern to a stored touch authentication pattern;
    authenticate a user to access the digital content at the first computing device based on the touch input pattern matching the stored touch authentication pattern; and
    enable the transfer of the digital content through the cable of the interactive cord based on the touch input pattern matching the stored touch authentication pattern.

2. The system of claim 1, wherein the touch input pattern comprises tapping the one or more capacitive touchpoints with a particular rhythm.

3. The system of claim 1, wherein the touch input pattern comprises touching absolute positions of the one or more capacitive touchpoints on the fabric cover.

4. The system of claim 1, wherein the touch input pattern comprises touching relative positions of the one or more capacitive touchpoints on the fabric cover.

5. The system of claim 1, wherein the touch input pattern comprises applying a particular amount of pressure to the one or more capacitive touchpoints on the fabric cover.

6. The system of claim 1, wherein the touch input pattern comprises sliding from one capacitive touchpoint to another capacitive touchpoint.

7. The system of claim 1, wherein the touch input pattern comprises touching multiple capacitive touchpoints at substantially the same time.

8. The system of claim 1, wherein the one or more of the capacitive touchpoints includes first and second capacitive touchpoints, and the touch input pattern comprises causing the first capacitive touchpoint to touch the second capacitive touchpoint.

9. An appliance comprising:
an interactive cord having:
    a cable configured to transfer power and communication signals to the appliance; and
    a fabric cover that covers the cable, the fabric cover comprising one or more conductive threads woven into the fabric cover to form capacitive touchpoints on the fabric cover of the interactive cord, the fabric cover having a weaving pattern that surfaces the capacitive touchpoints at intervals along the fabric cover of the interactive cord, the capacitive touchpoints configured to enable reception of a touch input pattern from a user based on a pattern of changes in capacitance to one or more of the capacitive touchpoints; and a controller configured to:
detect the touch input pattern to the one or more of the capacitive touchpoints;
compare the touch input pattern to a stored touch pattern;
authenticate the user responsive to the touch input pattern matching the stored touch pattern; and
trigger a function of the appliance responsive to authenticating the user using the touch input pattern.

10. The interactive cord of claim 9, wherein:
the appliance comprises a lamp; and
the function comprises adjusting a brightness of the lamp.

11. The interactive cord of claim 9, wherein:
the appliance comprises a fan; and
the function comprises adjusting a speed of the fan.

12. The interactive cord of claim 9, wherein:
the appliance comprises a headset; and
the function comprises adjusting a volume of audio content being played back via the headset.

13. The interactive cord of claim 9, wherein:
the appliance comprises an alarm clock; and
the function comprises initiating a snooze button on the alarm clock.

14. The interactive cord of claim 9, wherein the touch input pattern comprises:
tapping the one or more capacitive touchpoints with a particular rhythm;
applying a particular amount of pressure to the one or more capacitive touchpoints on the fabric cover; or
sliding from one capacitive touchpoint to another capacitive touchpoint.

15. A method comprising:
detecting a touch input pattern to one or more capacitive touchpoints of a fabric cover of an interactive cord coupled to an appliance, the fabric cover covering a cable of the interactive cord that is configured to transfer power and communication signals to the appliance, the touch input pattern being based on a pattern of changes in capacitance to the one or more capacitive touchpoints, the fabric cover comprising one or more conductive threads woven into the fabric cover to form a weaving pattern that surfaces a plurality of capacitive touchpoints at intervals along the fabric cover of the interactive cord, the plurality of capacitive touchpoints including the one or more capacitive touchpoints;
comparing the touch input pattern to a stored touch pattern;
authenticating a user based on the touch input pattern matching the stored touch pattern; and
triggering a function of the appliance responsive to authenticating the user using the touch input pattern.

16. The method of claim 15, wherein:
the appliance comprises a lamp; and
the function comprises adjusting a brightness of the lamp.

17. The method of claim 15, wherein:
the appliance comprises a fan; and
the function comprises adjusting a speed of the fan.

18. The method of claim 15, wherein:
the appliance comprises a headset; and
the function comprises adjusting a volume of audio content being played back via the headset.

19. The method of claim 15, wherein the touch input pattern comprises one or more of:
touching the one or more capacitive touchpoints with a particular rhythm;
applying a particular amount of pressure to the one or more capacitive touchpoints on the fabric cover; or
sliding from one capacitive touchpoint to another capacitive touchpoint.

20. The method of claim 15, wherein the touch input pattern comprises one or more of:
touching absolute positions of the one or more capacitive touchpoints on the fabric cover;
touching relative positions of the one or more capacitive touchpoints on the fabric cover;
touching multiple capacitive touchpoints at substantially the same time; or
causing one capacitive touchpoint to touch one or more other capacitive touchpoints.

21. The system of claim 1, wherein the intervals of the surfaced capacitive touchpoints comprise regular intervals along the interactive cord such that the one or more conductive threads are covered and hidden from view at areas of the fabric cover corresponding to the intervals.

22. The interactive cord of claim 9, wherein:
the intervals of the surfaced capacitive touchpoints are regular and similar in size to one another; and
the one or more conductive threads are covered and hidden from view at areas of the fabric cover corresponding to the intervals between the surfaced capacitive touchpoints.

23. The method of claim 15, wherein:
the one or more conductive threads comprises a plurality of sets of conductive threads;
each set of conductive threads corresponds to a subset of capacitive touchpoints of the plurality of touchpoints;
each subset of capacitive touchpoints is surfaced by the weaving pattern at regular intervals along the fabric cover of the interactive cord.

* * * * *